(12) United States Patent
Dowler et al.

(10) Patent No.: US 8,540,294 B2
(45) Date of Patent: Sep. 24, 2013

(54) REMOVABLE LADDER HANDLE

(75) Inventors: Aaron Dowler, Vancouver, WA (US); Joseph Jones, LaCenter, WA (US)

(73) Assignee: AJ Solutions, Inc., La Center, WA (US)

( * ) Notice: Subject to any disclaimer, the term of this patent is extended or adjusted under 35 U.S.C. 154(b) by 0 days.

(21) Appl. No.: 13/431,749

(22) Filed: Mar. 27, 2012

(65) Prior Publication Data
US 2012/0248802 A1 Oct. 4, 2012

Related U.S. Application Data

(60) Provisional application No. 61/516,008, filed on Mar. 28, 2011, provisional application No. 61/516,010, filed on Mar. 28, 2011.

(51) Int. Cl.
*B65G 7/00* (2006.01)

(52) U.S. Cl.
USPC .............................. 294/15; 294/148; 16/422

(58) Field of Classification Search
USPC .............. 294/15, 33, 148, 170; 16/422–430; 248/441.1, 312.1, 210, 229.16
See application file for complete search history.

(56) References Cited

U.S. PATENT DOCUMENTS

| | | | | |
|---|---|---|---|---|
| 2,029,051 A | * | 1/1936 | Blevins | 294/33 |
| 2,127,154 A | * | 8/1938 | Burk | 294/187 |
| 2,709,028 A | * | 5/1955 | Cottar | 294/148 |
| 3,414,910 A | * | 12/1968 | Provi et al. | 4/577.1 |
| 4,641,874 A | * | 2/1987 | Grenzer | 294/15 |
| 4,712,804 A | * | 12/1987 | Harrison, Jr. | 280/47.131 |
| 5,511,285 A | * | 4/1996 | Bush et al. | 16/422 |
| 5,794,998 A | * | 8/1998 | Lapierre | 294/15 |
| 5,979,840 A | * | 11/1999 | Hollister et al. | 248/76 |
| 7,588,225 B2 | * | 9/2009 | Wawerski | 248/311.2 |
| 2009/0121504 A1 | * | 5/2009 | Wolf et al. | 294/15 |
| 2011/0193306 A1 | * | 8/2011 | Mozo | 280/47.371 |

* cited by examiner

*Primary Examiner* — Saul Rodriguez
*Assistant Examiner* — Gabriela Puig
(74) *Attorney, Agent, or Firm* — Rylander & Associates, PC; Philip R. M. Hunt

(57) ABSTRACT

A removable ladder handle allows a user to carry a ladder comfortably with one hand or a shoulder strap. The removable ladder handle has a bar, one or more compression springs and one or more spring clips that have a concave downward shape. A middle section of each spring clip is coupled to the bar. The compression springs are coupled to the bar facing downward. Both end sections of each spring clip have inside hooks that face inward and upward. The spring clips and inside hooks are configured to fit over one of the side rails of a ladder and snap on to inner edges of the side rail when the removable ladder handle is engaged to the ladder by a user pushing the removable ladder handle down onto the side rail.

19 Claims, 5 Drawing Sheets

REMOVABLE LADDER HANDLE

CROSS-REFERENCE TO RELATED APPLICATION

This application is a continuation of and claims priority to Provisional Application Ser. Nos. 61/516,008, filed 28 Mar. 2011, and 61/516,010, filed 28 Mar. 2011, both incorporated herein by reference.

FIELD OF THE INVENTION

The present invention relates to accessories for ladders. More particularly, the present invention is configured for picking up and carrying ladders in a safe and comfortable manner.

BACKGROUND

In the construction world today, it's all about safety first. Construction jobs emphasize safety and will go to great lengths to come up with ways to make the construction field safer for their employees. Currently, people carry ladders at their side with just their hands. Doing this causes the ladder's side rail to dig into the hands of the user making it painful to the user's hands even when wearing gloves. Another way to carry a ladder is on the user's shoulders. This is frequently done when it hurts the user's hands to much to continue on, and the ladder is thrown on the shoulders. Once the ladder is on the user's shoulders another set of problems occur: Pain to the shoulders, neck and back. On top of that, the user's vision is limited due to the obstruction of the ladder. These problems are amplified by the fact that when the ladders are used, they typically are moved repeatedly throughout the day. When carrying ladders by the hand method, the ladders are rarely well balanced because the rungs of the ladders are in the way of grasping the ladder in a manner that provides balance. Unbalanced carrying causes the top or bottom of the ladder to tend to drag on the ground, requiring the user to apply a torque with the hand to prevent dragging. This makes it difficult and tiring to carry the ladder.

Prior art solutions are not adequate. One prior art solution uses straps and Velcro to pick up the ladders. Eventually the Velcro will wear out. The nylon strap is vulnerable to rip and tear. The nylon strap of this prior art solution goes through the rungs of the ladder, the outer edges of which are frequently sharp. This will cause rips and tears in the nylon strap. The removable ladder handle on this prior art solution is semi-permanent and it takes the user a little time to remove it in order to transfer the removable ladder handle to another ladder. Eliminating these defects in the prior art will prove more economical for the user.

SUMMARY

The present invention, a removable ladder handle allows a user to carry a ladder comfortably with one hand or a shoulder strap. The removable ladder handle has a bar, one or more compression springs and one or more spring clips that have a concave downward shape. A middle section of each spring clip is coupled to the bar. The compression springs are coupled to the bar facing downward. Both end sections of each spring clip have inside hooks that face inward and upward. The spring clips and inside hooks are configured to fit over one of the side rails of a ladder and snap on to inner edges of the side rail when the removable ladder handle is engaged to the ladder by a user pushing the removable ladder handle down onto the side rail.

The present invention overcomes problems associated with the prior art. Specifically, it is designed to stay attached to the ladder or be easily removed and used for other ladders. The present invention also has the ability to be stored anywhere on one of the side rails of the ladder. The compact size of the present invention makes it easy for the user to removable ladder handle and maneuver. Due to the unique construction and materials used in the present invention, the described removable ladder handle will last longer than the devices known in the art. Furthermore the removable ladder handle's spring clips and can be stored anywhere on the ladder's side rail. The removable ladder handle of the present invention presents numerous advantages, including: (1) mobility—the removable ladder handle to be used on more than one ladder; (2) compact size for easy handling; (3) clips on and off in seconds; (4) has long lasting materials; (5) will save contractors money by not having to purchase one for every ladder and (6) can be colored to contractor's choice for easier identification and theft protection. Additional advantages of the invention will be set forth in part in the description which follows, and in part will be obvious from the description, or may learn by practice of the invention. Further benefits and advantages of the embodiments of the present invention will become apparent from consideration of the following detailed description given with reference to the accompanying drawings, which specify and show all of the preferred embodiments of the present invention.

BRIEF DESCRIPTION OF THE DRAWINGS

The accompanying drawings, which are incorporated into and constitute a part of this specification; illustrate one or more embodiments of the present invention and, together with the detailed description, serve to explain the principles and implementations of the invention.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

The description may use perspective-based language such as up/down, back/front, and top/bottom. Such language is merely used to facilitate the discussion, showing relative orientation and location of components to one another and is not intended to restrict the application of embodiments of the present invention to particular orientations.

Figure 1:
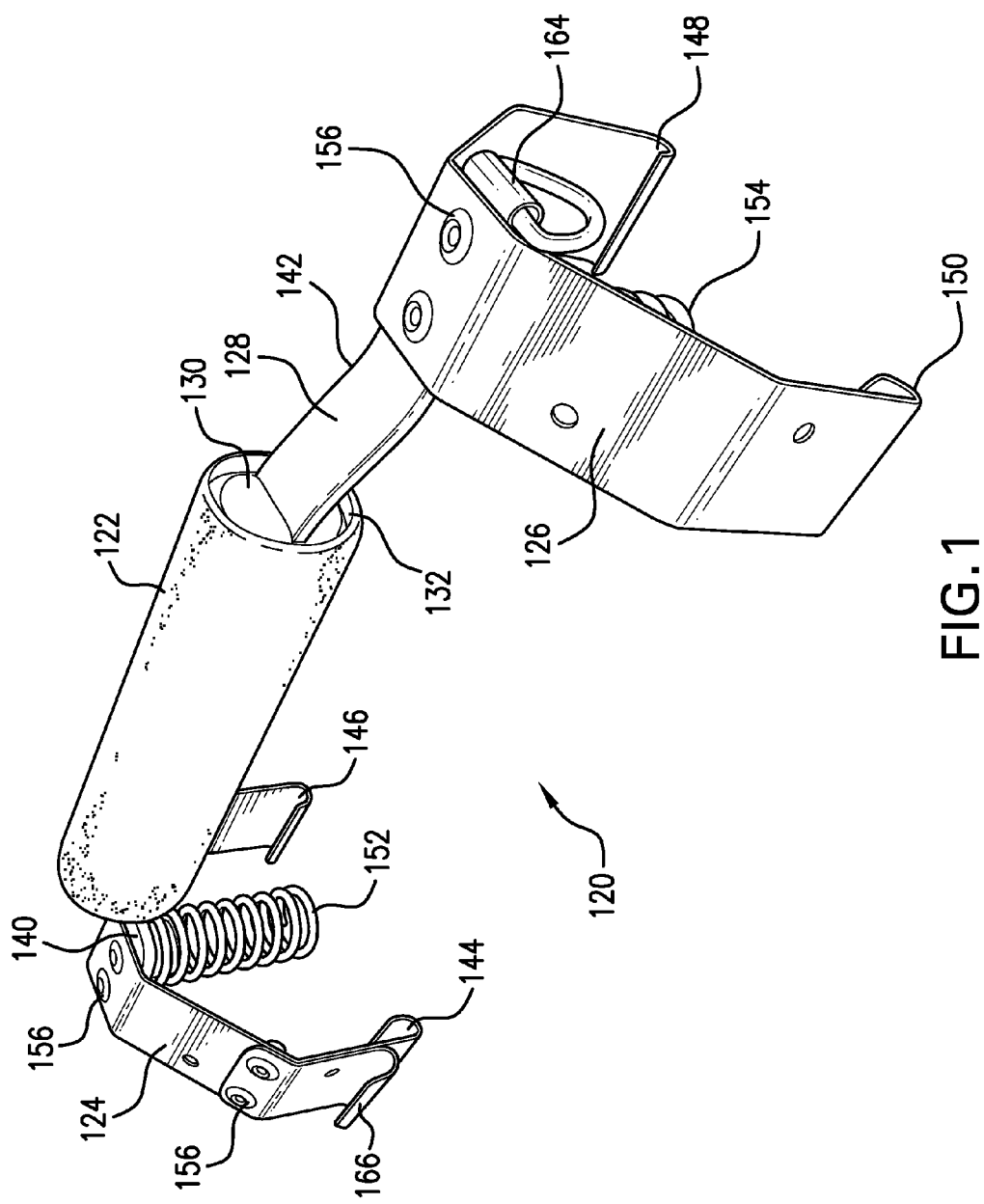
FIG. 1 shows a perspective-view of an embodiment of a removable ladder handle.
Figure 2:
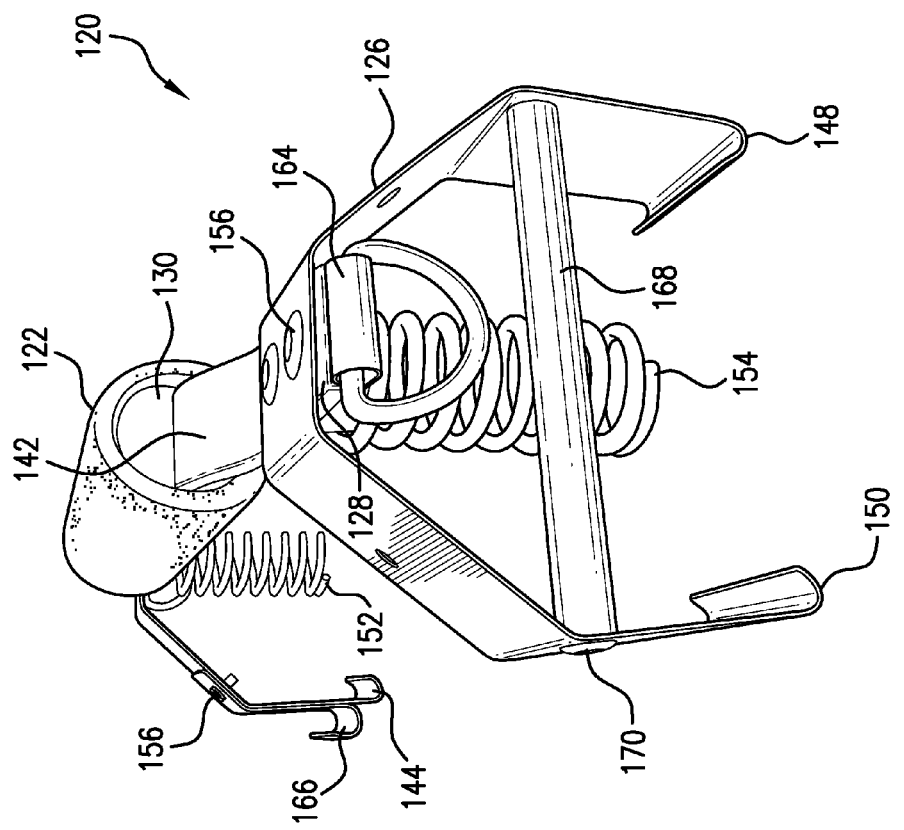
FIG. 2 shows an end-view of an embodiment of a removable ladder handle.
Figure 3:
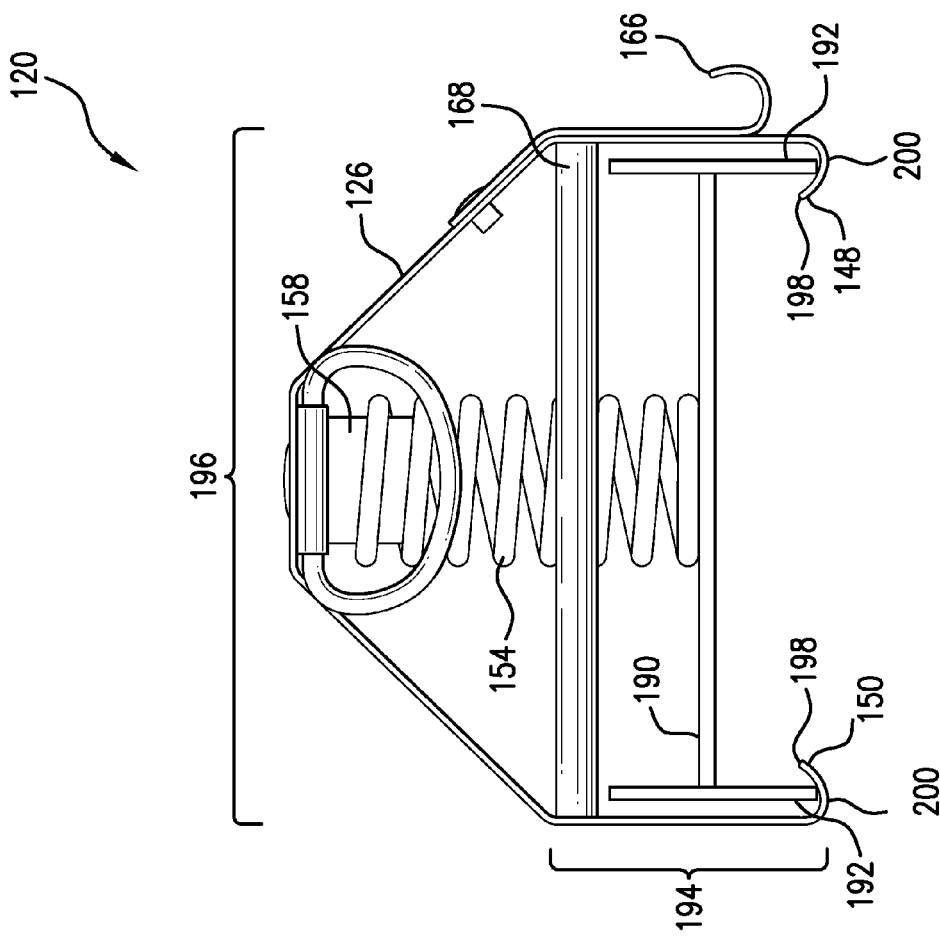
FIG. 3 shows an end-view of an embodiment of a removable ladder handle from the end opposite that shown in FIG. 2.

FIGS. 1-3 show an embodiment of a removable ladder handle 120. The removable ladder handle 120 has a foam cushioned grip 122 that wraps around two removable ladder handle base pieces 130 and 132, configured to provide a comfortable place to grip. The foam cushion grip 122 is made of closed cell foam that is durable and water and oil resistant. The removable ladder handle base pieces 130 and 132 are of plastic formed by an injection molding process in this embodiment, but may be of other suitable materials in other embodiments. The removable ladder handle base pieces 130, 132 are male and female, respectively having protrusions and matching receptacles (not shown). The removable ladder handle base pieces 130, 132 sandwich a bar 128. The protrusions mate with the matching receptacles by way of three ¼ inch holes through the bar 128.

The bar 128 in this embodiment is flat and made of steel, but in other embodiments it may be made in other shapes and of other suitable materials. The bar 128 is sufficiently rigid so that is does not significantly deform when the removable ladder handle 120 is pushed down by the force of a human hand. There are offsets 140, 142 in the bar 128 that provide clearance between a side rail of a ladder 176 and the foam cushion grip 122, making room for a user's fingers while gripping the removable ladder handle 120.

The removable ladder handle 120 has spring clips 124, 126, each with a middle section 196 and two end sections 194. The spring clips 124, 126 are coupled with rivets 156 on each end of the bar 128, past the offsets 140 and 142. In other embodiment, coupling mechanisms other than rivets may be used, such as bolts or welding joints. The spring clips 124, 126 are made of heat treated galvanized steel, but may be made of other suitable material. The middle sections 196 of the spring clips 124, 126 are formed in a concave shape, such as a flattened "V" (as shown) or a "U" shape. The two end sections 194 of each of the spring clips 124, 126 are substantially parallel to each other, allowing the spring clips 124, 126 to fit over the side rails 190 of the ladder 176. In other embodiments, the end sections 194 are not substantially parallel to each other, but angle downward and inward.

The spring clips 124, 126 have two inside hooks each, with inside hooks 144, 146 coupled on the end sections of spring clip 124, and inside hooks 148, 150 coupled on the end sections of spring clip 126. In this embodiment, the inside hooks 144, 146, 148, 150 are each formed from the same piece of sheet metal as their respective spring clips 124, 126 by rolling the lower edges 198 of the spring clips 124, 126 inward until the lower edges 198 point inward (toward a centerline of the removable ladder handle) and at an upward angle 200 that is more than horizontal, but less than vertical. In other embodiments, the lower edges 198 may be vertical. In other embodiments, the inside hooks 144, 146, 148, 150 may be made of separate pieces or sheet metal, wire or other material forms that are attached to the spring clips 124, 126.

The spring clips 124, 126 and inside hooks 144, 146, 148, 150 are configured to fit over one of the side rails of a ladder and snap on to inner edges of the side rail when the removable ladder handle 120 is engaged to the ladder by a user pushing the removable ladder handle 120 down onto the side rail. This embodiment exploits the fact that most extension ladders have very similar construction: An upper section and a lower section, the upper section dimensionally smaller than the lower section, each section with two side rails and rungs between the side rails. The side rails typically have an I-beam shape and the lower section side rails are typically 2.5 inches wide. The end sections of the spring clips 124, 126 are separated by a distance slightly more than a width of a standard extension ladder side rail, about 2.5-3.5 inches. The separation distance is wide enough so that inward and upward angled surfaces of the inside hooks 144, 146, 148, 150 make contact the side rail of the standard ladder, but not so wide that the inside hooks miss the side rail altogether. When the inward and upward angle pointing inside hooks 144, 146, 148, 150 make contact the one of the side rails of the ladder, they generate a side force that pushes the inside hooks 144, 146, 148, 150 sideways away from the ladder side rail. The spring clips 124, 126 have a spring-back memory. This memory allows spring clips 124, 126 and the inside hooks 144, 146, 148, and 150 to move outward under the force of a user pushing the removable ladder handle 120 onto the side rails, and then snap back inward to latch to the ladder side rail. The removable ladder handle 120 of this embodiment will also work with ladders that have side rails not of standard size. If a ladder has side rails wider than standard, then the user can place one end section 194 and hook 150 against the side rail, pull the spring clip 126 apart with the user's hand while pushing down on the removable ladder handle with the user's other hand until the inside hook 148 of the other end section clears the side rail, repeating for the other spring clip 124. If a ladder has side rails narrower than standard, then the user can push the spring clips 124, 126 together with the user's hand while holding the removable ladder handle 120 down onto the side rail with the user's other hand, then easing pressure on the removable ladder handle 120, allowing the compression springs 152, 154 to push the removable ladder handle 120 back up and the inside hooks 144, 146, 148, 150 to grab hold of the inside edges 192 of the side rail 190.

In other embodiments, the end sections of the spring clips 124, 126 are separated by a distance much greater or less than the width of a standard extension ladder side rail. Such embodiments would be useful for non-standard ladders.

Compression springs 152, 154 are coupled to the bar 128 and to the middle sections 196 of spring clips 124 and 126, respectively, on the concave side. The compression springs 152, 154 are configured to force inside hooks 144, 146, 148, 150 tight against the inner edges 192 of the side rail 190. These compression springs 152, 154 force the spring clips 124, 126 and the side rail 190 of the ladder away from each other, functioning to keep the removable ladder handle 120 snug to the ladder. In this embodiment, the compression springs 152 and 154 are tapered, but in other embodiments they are straight or some other shape. The compression springs 152, 154 are coupled to the bar 128 by spring bases 158. The spring bases 158 have shapes that conform to the dimensions inside the narrow end of the taper of the compression springs 152, 154. The spring bases 158 each have a center hole that will accommodate a rivet 156. The spring bases 158 are riveted to the bar 128 by rivets 156 while deposed within the narrow end of the taper of the compression springs 152, 154, holding the compression springs 152, 154 against the bar 128. In other embodiments, the compression springs 152, 154 may be attached in other ways such as bolts or welded joints. In some embodiments, the ends of the compression springs 152, 154 are covered with a cap made of rubber or plastic or other suitable material to prevent the compression springs 152, 154 from damaging the ladder.

In this embodiment, the removable ladder handle 120 has a back hook 166. In some embodiments, the back hook 166 is piece of galvanized steel, but in other embodiments, it may be made from other suitable materials. The back hook 166 is coupled to an outside surface of the end section of one of the spring clips 124 or 126 with rivets, bolt, welds or other suitable connectors. The back hook 166 makes carrying an A-frame ladder with the removable ladder handle easier. The back hook 166 is configured to hook on to an edge of the smaller leg of an A-frame ladder when being carried, preventing the smaller leg from swinging out away from the rest of the ladder.

The removable ladder handle 120 has D-rings 164 attached to either end by rivets 156 or other suitable attachment method. The D-rings 164 give the user an option to use a shoulder strap when carrying a ladder.

In some embodiments, the removable ladder handle 120 has a security rod 168 attached to one of the spring clips 126 with tamper proof screws 170 or some other suitable attachment mechanism. Using less common screw heads help the security rod 168 stay in place. The security rod 168 is configured to keep the removable ladder handle 120 from accidentally disengaging from the ladder due to jostling while the user is transporting the ladder. The security rod 168 is positioned in the concavity of the spring clip 126 where it will be just above the side rail 190 of the ladder when the removable ladder handle 120 is engaged to a ladder, just far enough above to allow the user to push down and deliberately disengage the removable ladder handle 120. The optimal placement of the security rod 168 above the top of the inside hooks 144, 146, 148, 150 is just more than the thickness of the ladder it is intended to carry. Standard extension ladders have side rails 190 that are 1 inch thick, so the optimal placement of the security rod 168 for standard extension ladders is 1 to 1.25 inches above the top of the inside hooks 144, 146, 148, and 150. In some embodiments, the height of the security rod 168 is adjustable.

Figure 4:
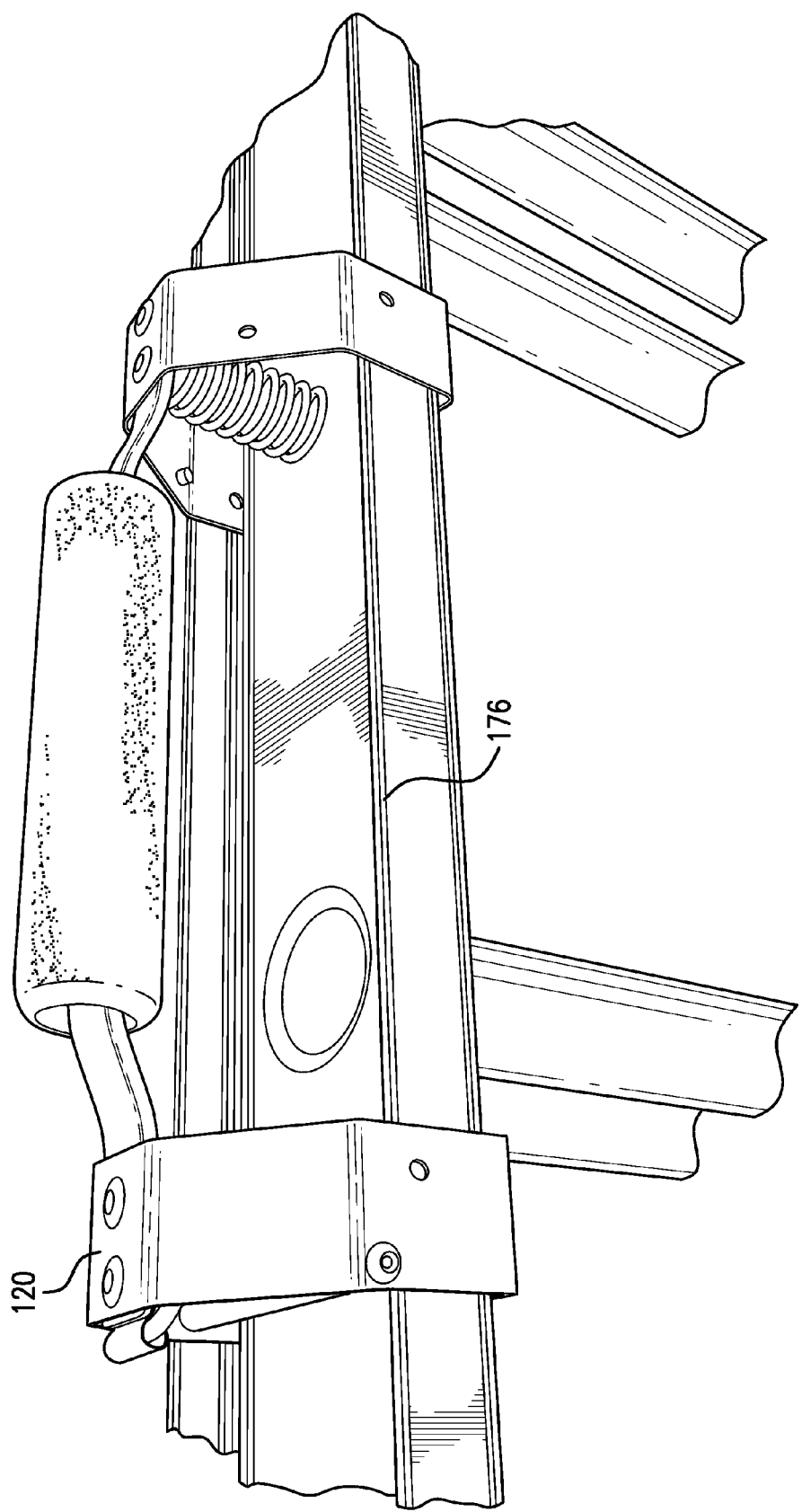
FIG. 4 shows an embodiment of the removable ladder handle engaged to a ladder.
Figure 5:
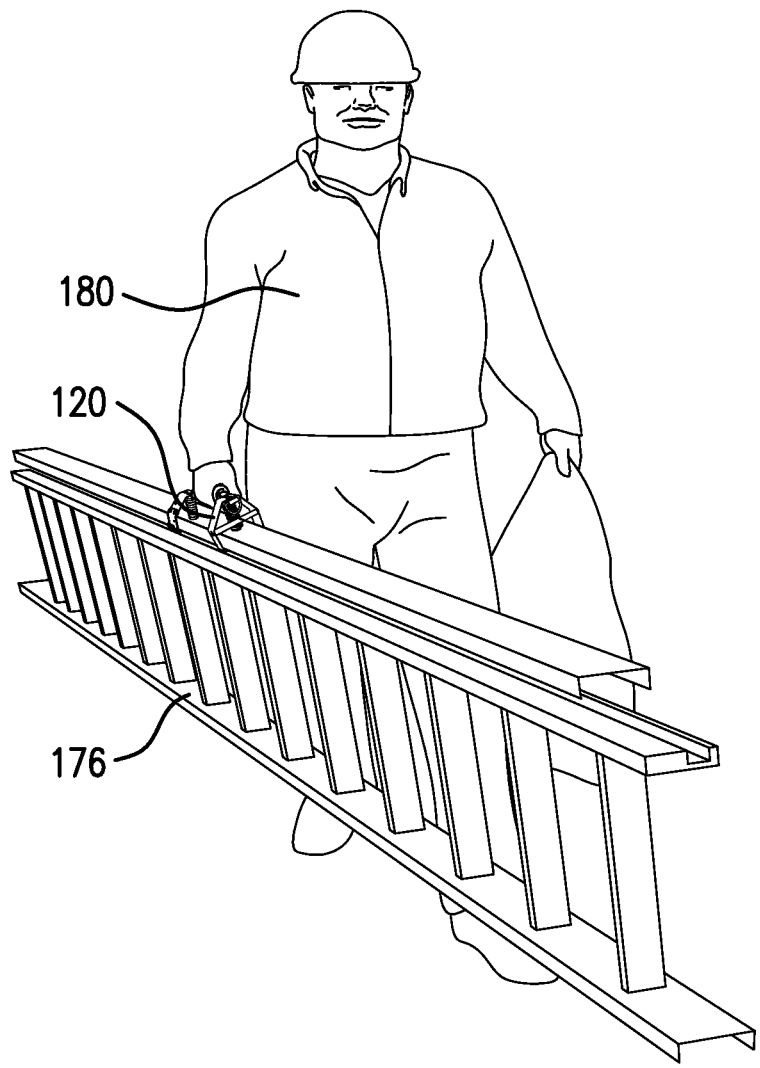
FIG. 5 shows a user carrying a ladder with an embodiment of the removable ladder handle.

FIG. 4 shows an embodiment of the removable ladder handle engaged to a ladder and FIG. 5 shows a user carrying a ladder with an embodiment of the removable ladder handle. The user 180 finds the balancing point of the ladder 176, and then lines the center of the removable ladder handle 176 up with the balancing point. While grabbing both ends of the removable ladder handle 120, the user 180 pushes the removable ladder handle 120 down on the ladder 176 until all four inside hooks 144, 146, 148, 150 lock in place. Now the ladder 176 is now ready for transport. To remove the removable ladder handle 120, the user 180 pushes down on the removable ladder handle 120 with one hand, pulls the inside hooks 144, 146, 148, and 150 away from the edges of the ladder 176 while easing pressure on the removable ladder handle 120, allowing the removable ladder handle 120 to move up and disengage from the ladder 176.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that the invention be limited only by the claims and the equivalents thereof.

We claim:

1. A removable ladder handle device comprising:
   a bar with an upward facing side and a downward facing side;
   at least two spring clips, each with a middle section, two end sections and two inside hooks;
   the middle section of each of the spring clips coupled to the bar;
   each of the spring clips with a concave downward shape;
   each of the inside hooks coupled with one of the spring clip end sections;
   each of the inside hook facing inward and upward; and
   at least two compression springs, each coupled to the downward facing side of the bar.

2. The device of claim 1, wherein end sections of each spring clip are substantially parallel and separated by a distance slightly more than a width of a standard extension ladder side rail.

3. The device of claim 1, wherein end sections of each spring clip are substantially parallel and separated by a distance of 2.5 to 3.5 inches.

4. The device of claim 1, further comprising:
   a back hook coupled to one of the spring clips, facing outward and upward.

5. The device of claim 1, further comprising:
   a plurality of rings attached to the removable ladder handle, at least one at each end, configured to allow attachment of a shoulder strap.

6. The device of claim 1, further comprising:
   a security rod coupled to one of the spring clips, deposed between the end sections.

7. The device of claim 1, wherein the compression springs are tapered springs.

8. The device of claim 1, wherein each compression spring is coupled to the bar where the bar is coupled to one of the spring clips.

9. The device of claim 1, wherein each inside hook is a piece of sheet metal bent into an inside hook shape.

10. The device of claim 9, wherein each piece of sheet metal that forms one of the inside hooks is part of a monolithic piece of sheet metal that forms a rest of the spring clip.

11. A removable ladder handle device comprising:
    a bar with an upward facing side and a downward facing side;
    a spring clip, with a middle section, two end sections and two inside hooks;
    the middle section of the spring clip coupled to the bar;
    the spring clip with a concave downward shape;
    each of the inside hooks coupled with one of the spring clip end sections;
    each of the inside hooks facing inward and upward; and
    a compression spring coupled to the downward facing side of the bar.

12. The device of claim 11, wherein end sections of the spring clip are substantially parallel and separated by a distance slightly more than a width of a standard extension ladder side rail.

13. The device of claim 11, wherein end sections of the spring clip are substantially parallel and separated by a distance of 2.5 to 3.5 inches.

14. The device of claim 11, further comprising:
    a back hook coupled to the spring clip, facing outward and upward.

15. The device of claim 11, further comprising:
    a plurality of rings attached to the removable ladder handle, at least one at each end, configured to allow attachment of a shoulder strap.

16. The device of claim 11, further comprising:
a security rod coupled to one of the spring clips, deposed between the end sections.

17. The device of claim 11, further comprising:
a security rod coupled to one of the spring clips, deposed between the end sections, 1 to 1.25 inches above a top of the inside hooks.

18. The device of claim 11, wherein the compression spring has a tapered shape.

19. The device of claim 18, further comprising:
a spring base with a shape that conforms to dimensions inside a narrow end of the tapered shape of the compression spring;
the spring base deposed with the narrow end of the tapered shape of the compression spring; and
the spring base coupled to the bar with a rivet.

* * * * *